(12) United States Patent
Hughey

(10) Patent No.: US 9,673,682 B2
(45) Date of Patent: Jun. 6, 2017

(54) HYBRID VERTICAL ENERGY STORAGE SYSTEM

(75) Inventor: Charles E. Hughey, Mishawaka, IN (US)

(73) Assignee: Charles E. Hughey, Granger, IN (US)

( * ) Notice: Subject to any disclaimer, the term of this patent is extended or adjusted under 35 U.S.C. 154(b) by 485 days.

(21) Appl. No.: 13/136,176

(22) Filed: Jul. 26, 2011

(65) Prior Publication Data

US 2012/0019008 A1 Jan. 26, 2012

Related U.S. Application Data

(60) Provisional application No. 61/400,298, filed on Jul. 26, 2010.

(51) Int. Cl.
*H02K 7/18* (2006.01)

(52) U.S. Cl.
CPC .................................. *H02K 7/1823* (2013.01)

(58) Field of Classification Search
CPC ..................................................... H02K 7/1823
USPC ................. 290/1 R, 1 D, 50, 42, 53; 60/504, 60/495–502, 505; 417/330–333; 415/5; 416/7, 85
See application file for complete search history.

(56) References Cited

U.S. PATENT DOCUMENTS

| 4,843,250 A | * | 6/1989 | Stupakis | F03B 13/20 290/53 |
| 5,461,862 A | * | 10/1995 | Ovadia | F03B 13/142 60/502 |

(Continued)

*Primary Examiner* — Viet Nguyen

(57) ABSTRACT

A hybrid vertical energy storage system is invented wherein the components responsible for the conversion, storage and production of energy are used as the weighted component of a gravitationally aided energy storage device. The present invention allows gravity to operate mechanical devices which may help move a volume of fluid in order to compress a gas and store potential energy. The present invention utilizes the attributes of pumped hydro by using gravity assisted fluid transfer, and also combines Compressed Air Energy Storage (CAES) functionality by powering hydraulic pumps and motors to transfer fluid from one vessel to another vessel. This feature allows conventional, inexpensive, market proven components to make the capture, conversion, storage and production of energy more effective and affordable while eliminating the placement issues associated with such large scale pumped hydro and CAES systems while extending battery service life. Ideally, combining the positive attributes of some or all of the existing technologies into one energy storage system would provide a real and meaningful improvement, especially if the improvement reduced or eliminated economic, environmental and operational flaws associated with the individual technologies. This invention also provides a method of combining the output of individual, combined attribute energy storage systems to provide user definable and expandable electrical energy production. The vertical aspect of the invention allows operational attribute that separates and makes independent the capture and storage of energy being placed into the energy storage system and the hydro-pneumatic production of energy exiting the system.

1 Claim, 4 Drawing Sheets

(56) References Cited

U.S. PATENT DOCUMENTS

| | | | | |
|---|---|---|---|---|
| 6,546,726 | B1* | 4/2003 | Tomoiu | F03B 17/02 60/495 |
| 7,765,804 | B2* | 8/2010 | Davis | F03B 17/00 185/33 |
| 2006/0267346 | A1* | 11/2006 | Chen | F03B 17/04 290/54 |
| 2007/0080540 | A1* | 4/2007 | Tung | F03B 17/04 290/43 |
| 2007/0248339 | A1* | 10/2007 | Akiyama | F03G 3/00 392/441 |
| 2009/0193808 | A1* | 8/2009 | Fiske | F03D 1/001 60/721 |
| 2011/0018269 | A1* | 1/2011 | Moser | F03D 7/0204 290/44 |
| 2012/0013131 | A1* | 1/2012 | Yeh | F03G 7/10 290/1 D |
| 2012/0112472 | A1* | 5/2012 | Murray | H02J 15/003 290/1 R |

* cited by examiner

HYBRID VERTICAL ENERGY STORAGE SYSTEM

This patent application is a continuation-in-part and claims priority to the disclosures in U.S. Patent Application 61/400,298 to Applicant filed on Jul. 26, 2010, the complete disclosure of which is hereby expressly incorporated by reference.

BACKGROUND OF THE INVENTION

This invention relates to an energy storage and power system, and in particular an energy storage and power system that is of a hybrid design which combines existing, market proven components in a unique design which provides for the high efficiency capture, conversion, storage and production of energy.

This invention includes a gravitational component to maximize the conversion, transfer and storage of energy, streamline the design and increase overall system efficiency. The system is scalable in size and capacity.

This invention has many applications and there are many architectures upon which the same basic purpose, function and operation can be achieved by altering the general system described herein.

Therefore, it is understood that this patent application shall include all deviations of this design and reference same herein, and that the illustrative design described herein is just one possible design, function, use and operation of the fundamental invention.

The purpose of this invention is to provide a highly efficient compartmentalized and expandable energy storage system, used for, in some embodiments, storage and distribution of energy.

This embodiment of the invention is an electric, hydraulic and gravitational hybrid energy storage system that may be used in an electric utility grid application to store electrical generation overcapacity. The stored energy may be provided to the electrical utility grid when there is increased demand.

Further, this invention may be considered a load leveling system for the utility grid. Leveling the electrical load is a needed function of the utility grid, from a seasonal, weekly, daily, hourly and even a fractional hourly perspective. Wildly fluctuating electrical loads are destructive to the utility grid, and load leveling decreases the stress applied to the grid and makes the production of energy more cost effective, reliable and efficient.

There are many energy storage systems in place which serve as load leveling devices such as batteries, flywheels, gravitational, chemical and pneumatic systems. These systems are all being used to store energy and to balance the electrical grid. All of these systems have their own strengths, weaknesses and efficiencies.

Compressed air energy storage (CAES), gravitational pumped hydro, flywheel and different battery chemistry storage systems are all in operation, with compressed air and pumped hydro being the least expensive in terms of long term costs and yet the most inflexible in terms of location/use, and the flywheel and battery systems which have much higher costs but are most flexible in terms of location/use.

Battery storage is an obvious choice for utility industry, as both the A/C energy that the utility operators produce and the batteries which store energy are both electrical in nature requiring only the conversion of the current (A/C to D/C or D/C to A/C) to be effective. Battery only based energy storage systems rely solely on the batteries to provide all of the energy when the demand is placed upon them. The high current draws experienced in battery only based energy storage systems may be detrimental to the life span of the batteries and associated electronics.

Batteries, regardless of chemistry, either have high power density or high energy density, but not both. When designing a battery storage system, the specific uses and needs of the application will dictate power dense or energy dense chemistries. Further, the battery is the only device in a battery based storage system which may accept and discharge energy. This is not economically viable because charging and discharging batteries at high rates are detrimental to the batteries chemistry and shorten the batteries service life, which increases long term operation and maintenance costs.

In order to reduce these costs and optimize the batteries life span, discharge rates should be low and even. This is not possible in a battery only storage technology as large current draws are a matter of function. Deep and repeated charge/discharge rates kill batteries. A battery management system must monitor all the batteries voltages and temperatures which is expensive and complicated. There is research and development to improve battery chemistries, but a near term solution has not been found as of this writing.

What is needed is an alternative to centralized battery energy storage facilities as they exist today, one that provides the energy density needed to operate a system that may provide meaningful grid balanced and high current output over a period of time with less destructive high charge/discharge rates.

Another example of an energy storage system that needs improvement is gravitational pumped hydro. Pumped hydro has the largest share of the installed energy storage capacity market due to its simplicity and its power density. However, there are many problem associated with pumped hydro, including geographical placement, environmental and facility installation cost, environmental impacts on existing ecosystems and the amount of time between conception and operation can and has taken decades.

The placement of a pumped hydro facility requires a substantial elevation difference in close proximity to both the upper and lower water reservoirs which is not always near electrical transmission or distribution infrastructure. The absence of these facilities requires expensive transmission lines to be installed to operate with the pumped hydro facility.

Also, the required economic capital is immense and includes a lengthy site selection process, environmental impact studies which can cost millions, construction costs which may total hundreds of millions of dollars and then there are the long term operational and maintenance costs.

The advantages of using gravitational pumped hydro energy storage are low specific energy costs, long lifetime, low maintenance, reasonable energy density and good reliability. The disadvantages of using pumped hydro energy storage are significant geographical placement hurdles as there must be a significant difference in elevation between the two bodies of water, high up front capital and environmental study costs, a decade or more of planning and construction, and finding geographical locations which are near electrical transmission and distribution facilities.

What is needed is an alternative to the centralized pumped hydro energy storage facilities as they exist today, one that may provide the power density needed to provide meaningful grid balanced and high current output over a period of time with less costs and fewer installation site restrictions, and yet use the same efficient gravitational functionality provided by pumped hydro systems.

Another example of an energy storage system that needs improvement is Compressed Air Energy Storage, or CAES. CAES is similar to pumped hydro in that the site itself is large and the site selection process is both lengthy and restrictive. Underground caverns that are large enough and strong enough for meaningful energy storage are not easily found. There are only so many abandoned salt mines or natural caverns. Lengthy and expensive environmental impact studies are also required of a CAES facility. Also, geographically satisfactory locations for CAES systems are rarely near electrical transmission or distribution infrastructure, which requires expensive transmission lines to be installed to operate the CAES facility.

Further, a CAES system requires a fueled power plant that utilizes the compressed air to make the cost of producing energy less expensive. And while the compressed air may improve the efficiency of the fueled power plant, CAES does not provide a standalone and emission free energy storage system. What is needed is an alternative to centralized and site restrictive CAES facilities as they exist today and yet use the efficient functionality of gas compression and expansion similar to a CAES system.

The advantages of using compressed air energy storage (CAES) are low specific energy costs, long lifetime, low maintenance, reasonable energy density and good reliability. The disadvantages of using compressed air energy storage (CAES) are significant geographical and subterranean placement hurdles, high up front capital costs and finding geographical locations which are near electrical transmission and distribution facilities. Further, current compressed air energy storage (CAES) technologies use the compressed air to assist a fueled power plant, which produces undesirable environmentally damaging emissions.

Examples of energy storage systems are found in U.S. Pat. No. 7,281,371 B1 to Heidenreich, U.S. Pat. No. 7,963,110 B2 and US20100307156A1 to Bollinger (isothermal expansion control) and others, U.S. Pat. No. 7,770,331 B2 to Halloran, all of which are incorporated fully herein by reference.

An issued U.S. patent for an energy storage and distribution device that uses principals that are similar to the present invention by combining the attributes of pumped hydro (PH) and compressed air energy storage (CAES), but does not use batteries or a gravitationally aided drive system, was issued on Oct. 16, 2007 and is titled "Compressed Air Pumped Hydro Energy Storage and Distribution System" (U.S. Pat. No. 7,281,371 B1) to Heidenreich, incorporated fully herein by reference. Heidenreich teaches the art of using water and air with elevation and pressure differential to store energy.

In the preferred Heidenreich embodiment, during times of excess capacity in the electrical grid, electricity is used to move water from an area of greater elevation, such as an atmospherically exposed reservoir, to an area of lower elevation, such as a sealed subterranean enclosure which has an area of enough volume to receive the reservoirs volume of water and yet still allow an area of volume to provide a space where the compression of a volume of air may occur. Said subterranean enclosure may also be abandoned mine shafts, salt mines, or other subterranean areas which may be suitable for effective operation of the Heidenreich patent.

In Heidenreich, the movement of water is accomplished with the use of a fluid pump/motor and an electrical motor/generator. During energy storage, the electric motor/generator operates as an electric motor which operates a fluid pump/motor as a pump and moves a volume of water from the atmospherically exposed reservoir through an inter-connecting tube to the sealed subterranean enclosure. This causes the pressure of the volume of air in the sealed enclosure to rise, storing potential energy.

In "power generating application", the compressed air forces the water in the sealed subterranean enclosure to move through the inter-connecting tube and to the atmospherically exposed reservoir. This movement causes the fluid pump/motor to operate as a motor which operates the electric motor/generator as a generator, thereby generating electrical energy which may be exported to an electric grid.

Heidenreich also teaches that an air compressor may be provided which may be powered electrically from excess electrical energy capacity in the grid, and is pneumatically connected to the sealed subterranean enclosure to provide both initial pressurization of the sealed subterranean enclosure and replace decreasing air and pressure in the sealed subterranean enclosure due to system operation and/or leaks.

Additionally, Heidenreich also teaches several configurations and embodiments, such as using a second subterranean enclosure which is atmospherically vented instead of an atmospherically exposed reservoir and having said atmospherically vented subterranean enclosure placed at a higher subterranean elevation than the first sealed subterranean enclosure, effectively producing the same result when the Heidenreich invention operates.

Further, Heidenreich teaches that the compressed air in the sealed subterranean enclosure(s) may also provide the compressed air needed during the combustion process in a natural gas powered electrical energy generation facility, rather than having the natural gas powered electric generator consume real time energy to compress the air required for combustion.

However, while Heidenreich similarly combines many aspects of pumped hydro and CAES, Heidenreich does provide a means to reduce the size of the combined energy storage system in such a way as to allow compartmentalization on a scale which may allow an attribute combining energy storage system to be placed in virtually any environment, altitude or location and provide energy storage, production and distribution, as provided by the present invention.

Also, Heidenreich does not teach using gas charged hydraulic accumulators to combine the area for a volume of fluid and a volume of compressible gas, such as provided by the present invention. Using a gas charged hydraulic accumulator provides the ability to use nitrogen as the compressible gas, which has higher expansive properties when compared to ordinary air, thereby increasing the efficiency of the system overall. Further, the nitrogen gas in the gas charged hydraulic accumulator is sealed, allowing the system to operate without the use of any air contaminate filtration device or gaseous filtration system, which would be required with the Heidenreich patent. If any explosive gases were to enter the Heidenreich system and become compressed, and an ignition source such as an electrical failure or lightning ignited the mixture, the results could be catastrophic. This potentially fatal aspect of the Heidenreich patent is eliminated with the present invention.

Additionally, Heidenreich does not mention, beyond the scope of the stated functionality of Heidenreich, the use of belts, cables or any other mechanical device to operate a hydraulic pump to move a volume of fluid from an atmospherically vented reservoir to a sealed enclosure such as the gas charged hydraulic accumulator as provided in the present invention. Nor does Heidenreich disclose the combining or grouping of smaller attribute combining energy storage devices to provide any given or required energy storage or production capacity as provided by the present invention.

Further, Heidenreich does not disclose or teach using the components of the combined attribute energy storage system as the weighted component of a gravitationally aided energy storage device which converts, stores and produces energy. The present invention allows gravity to operate mechanical devices which may help move a volume of fluid in order to compress a gas and store potential energy.

Further still, Heidenreich does not teach a method of combining the output of individual combined attribute energy storage systems to provide user definable and demand regulated electrical energy production as the present invention discloses.

Even further, Heidenreich does not teach an operational attribute that separates and makes independent the capture and storage of energy being placed into the energy storage system and the hydro-pneumatic production of energy as taught in the present invention.

An issued U.S. patent for an energy storage and distribution device that uses principals that are similar to the present invention by combining the attributes of pumped hydro (PH) and compressed air energy storage (CAES), was issued on Jun. 21, 2011 and is titled "System and method for improving drivetrain efficiency for compressed gas energy storage" (U.S. Pat. No. 7,963,110 B2) to Bollinger and others, incorporated fully herein by reference. Bollinger teaches the art of providing a constant output from a decaying or fluctuating input pressure using staged accumulators. Bollinger does not teach using any of the components of the Bollinger patent as a part of the weighted component in a gravity-aided energy storage system as described by the present invention.

Another issued U.S. patent for an energy storage and distribution device that uses principals that are similar to the present invention by combining the attributes of pumped hydro (PH) and compressed air energy storage (CAES), was issued on Aug. 10, 2011 and is titled "Potential energy storage system" (U.S. Pat. No. 7,770,331B2) to Halloran, incorporated fully herein by reference. Halloran teaches the art of providing an energy storage system using a weighted structure, such as a buildings support beams, that is hydraulically lifted and then lowered to provide energy for hydraulically generated electricity. Halloran does not teach using any of the components of the Halloran patent as a part of the weighted component in a gravity-aided energy storage system as described by the present invention. Further, Halloran does not disclose the ability to add capacity at any time, nor does Halloran teach using the system outside of a buildings structure or at the top of a buildings structure.

While all of these existing forms of energy storage all have their own specific benefits, they also have economic, environmental and operations flaws which provides the need for improving the current state of the art in energy storage. Ideally, combining the attributes of some or all of the existing technologies into one energy storage system may provide a real and meaningful improvement to energy storage, especially if the improvement reduced or eliminated economic, environmental and operational flaws associated with the individual existing technologies.

The challenge continues to be to provide a low cost, highly efficient energy storage system that is flexible in location and use and provides a scalable and dynamic energy storage system that the utility companies may utilize for demand response, a form of spinning reserves, bridging power, dynamic response, load leveling, load shifting, load reduction and demand side management and other ancillary service while commercial end users may mitigate or eliminate peak energy costs by reducing utility provided energy and associated demand charges during peak energy times by using cost and time shifted energy in storage devices and/or systems.

Combining the different systems into one hybrid design allows the best attributes of each individual technology to be maximized at their highest efficiencies and provides a better overall solution. Adding a gravitational component aids in the transfer of energy at a high rate of efficiency.

Using a combination of existing electrical and hydraulic components, a new energy storage system is invented with a unique gravitational energy conversion and transfer system which provides high storage efficiency, reduces the strain on the batteries by eliminating the high current draw associated with battery energy storage systems and by segmenting the batteries to power their own unit or groups of units, eliminates the geographical placement hurdles associated with pumped hydro and compressed air energy storage, reduces the electric frequency regulation system complexity of other energy storage systems and associated costs while providing significant value to the utility providers and the end users.

The present invention provides a hybrid mix of the existing technologies in a novel and unique way which allows energy to be stored in an efficient and cost effective manner. Batteries are used for the main energy storage system, but are not relied upon to provide the heavy discharge currents associated with other battery energy storage systems. Hydraulically driven electrical generators provide the frequency matched electrical energy required for any application. Simple and inexpensive components lower long term operational and maintenance costs. Where hundreds or thousands of identical units are installed, only a handful of maintenance components are needed for servicing as the units are identical, leading further still to reduced manufacturing/assembly costs.

The present invention utilizes the attributes of pumped hydro using gravity assisted fluid transfer by mechanical means. The present invention also combines pumped hydro's fluid transfer with Compressed Air Energy Storage (CAES) functionality by powering hydraulic pumps and motors to transfer fluid from one vessel to another vessel during storage and power generation modalities. This feature allows conventional and existing market proven components to make the capture, conversion, storage and production of energy more safe, effective and affordable while eliminating hazardous conditions associated with high temp chemical energy storage systems, flywheel energy storage systems high speed explosive possibilities and the placement issues associated with such large scale pumped hydro and CAES systems, while extending a battery based energy storage systems battery service life.

SUMMARY OF THE INVENTION

In one embodiment of the invention, an energy storage system is provided and includes energy capture, conversion, storage and generation capabilities. The energy storage system includes an onsite electrical energy supply source, at least one electrical motor electrically connected to the electrical supply source, and a cylindrical shaped cable winding drum rotationally connected to and driven by said electrical motor. The energy storage system may also include a structure which supports the electric motor and cable winding drum at or near the top of the structure, and this structure may have a vertical height of enough measure to support the operational modalities of the invention. The energy storage system may also include a cable or other suitable connection device or item which may be attached to and start at the aforementioned cable winding drum, descend to or near the bottom of the structure, wrap around the rotating cable drum which is affixed to the top of the vertically moving carriage and ascend to the top of the vertical support structure where it is securely affixed to the structure itself and terminates.

The energy storage system may also include a carriage which houses the conversion, storage and production components. In one embodiment, this carriage may be made of metal, and may be approximately twelve inches square and four feet tall and may house at least one low pressure or atmospherically vented fluid reservoir, at least one high pressure fluid accumulator, at least one fixed or variable hydraulic motor fluidly connected to the reservoir and the high pressure accumulator and may be rotationally connected to and driving at least one electrical generator, which may be of the A/C sixty cycle type.

Further, the energy storage system may also include a fixed or variable displacement hydraulic pump which is fluidly connected to the reservoir and the high pressure accumulator and may be rotationally connected to a cylindrically shaped rotating cable drum affixed either on the top of the carriage or inside the carriage, so as to permit the carriage mounted rotating cable drum to be rotated by the cable and permit the rotating cable drum to operate the aforementioned rotationally connected hydraulic pump to transfer fluid from the reservoir to the high pressure accumulator during the carriages vertical travel.

The energy storage system may also include necessary components and control system(s) to provide the functionality described herein. These components, devices or apparatus that may or may not be part of the weighted components of the present invention and may include electrical connection devices such as wires or bus bars, hydraulic hoses, hydraulic directional flow and control valves, continuously variable transmission system(s), variable frequency drive(s), isothermal and/or progressive expansion controls, digital hydraulic controls, feedback control electronics or any other device or apparatus which may monitor the hydraulically driven electrical generators output, the hydraulic motors speed or the high pressure hydraulic accumulator pressure and/or the hydraulic fluid flow rates, and adjust the hydraulic fluid flow rates or electrical frequencies accordingly as the high pressure accumulator discharges to maintain the exact electrical frequency required by application and use, electrical connections situated to facilitate the export of energy from the carriage mounted hydraulically driven electrical generator to a device for export to the end user, wireless communication devices to facilitate communication between components, devices and/or the plurality of the present invention(s) and any and all other items deemed necessary to operate the invention as intended.

In one embodiment, electrical energy from the utility grid is supplied to charge a battery during times of over capacity in the electrical grid, perhaps at night, or from renewable energy. Once the battery is fully charged, the system waits for a load to be placed upon it, perhaps during the day at times of peak load on the grid. The battery may supply a current of electricity to the electric motor mounted on top of the vertical support structure to rotate the cable winding drum which is also mounted at the top of the vertical support structure. The rotating drum draws the cable upward, wrapping the cable around the drum as the drum rotates. The cable is drawn from below, where the cable is wrapped a number of turns around the carriage mounted rotating cable drum. Since the opposite end of the cable is affixed to the top of the structure, the entire carriage is drawn upward slowly while the rotating cable drum spins quickly. This function allows the hydraulic pump that is rotationally connected to and driven by the rotating cable drum at a set ratio to operate at a speed which is efficient for the transfer of fluid from the reservoir to the high pressure accumulator during the carriages vertical travel.

As the entire carriage is raised vertically, the fluid fills the high pressure accumulator to a portion of its volume. Once the carriage has reached its uppermost travel limit, the electrical connection between the battery and the electric motor is disconnected, allowing the carriage to descend by gravity. The cable on the cable wrapping drum unwinds, allowing the carriage to fall and the rotating cable drum to rotate in the opposite direction of its ascension direction. Control components will switch the fluid flow direction so that the fluid will continue to be transferred from the reservoir to the high pressure accumulator during the carriages vertical descent. The entire operation is timed to provide a fully charged accumulator upon completion of one up and down cycle. Gravity provides the energy to finish filling the accumulator, and the cable and the rotating cable drum provide the means to accomplish this task.

The carriage will sit at the bottom of the structure awaiting a control signal to begin producing electricity. Once a load is detected, a control device(s) will open the accumulator to permit a flow of hydraulic fluid to be routed to the hydraulic motor, which rotates the electric generator to provide electricity. Fluid is then directed to the reservoir. As the pressure in the accumulator falls, control electronics and hardware components adjust the flow rate of the discharging accumulator to maintain the desired frequency of the electricity. Once the accumulator has exhausted all of its available energy, the control electronics and hardware components close the hydraulic fluid discharge circuit and open the hydraulic fill circuit. The electrical connection is re-established between the battery and the electric motor and raises the carriage with the cable, and the cycle begins again.

While a single energy storage device may have limited use due to its interrupted cycling, multiple units grouped together may provide uninterrupted energy output. This is accomplished by turning on a group of units to provide the energy the load requires. Then, when the pressure in the operating units fall to a predetermined point where no usable energy may be produced, a second group of units is turned on to continue the flow of energy. The previously discharged units are now cycled again, raising them up and dropping them to fill the accumulators and await the next signal to discharge their energy and produce electricity.

The battery is only used to raise the carriage, allowing the energy from the battery to be discharged slowly and predictably at low currents. Also, this operational strategy allows time for the battery to be recharged using renewable energy, such as that which may be provided by solar panels, wind turbines and/or tidal energy system.

This invention and strategy provides a customizable energy storage system which may allow precise electrical energy production to match a given load. This is especially helpful when the load may vary, such as when a machine may have a large start up draw, but then reduces its energy consumption once the machine is in motion. This holds true for HVAC systems, which may be dedicated to this energy source as HVAC is the largest consumer of real time energy for most commercial applications.

This invention and strategy is also useful to allow electric utility providers to closely follow a load profile without wasting energy, such as when pumped hydro or CAES discharges to produce energy. These large systems do not have the granular control that the present invention would provide to closely follow a load profile.

This invention and strategy is also useful to allow commercial end users to have on site energy storage that would allow them to eliminate their consumption of peak energy and the costs associated with peak energy use. Also, the present inventions system granularity provides a fully customizable energy storage solution for virtually any application.

This invention and strategy is also useful to allow renewable energy production to store energy when the renewable is available but there is no load to consume the energy. This storage and time shifted export of energy is of great value to renewable energy concerns.

This invention and strategy is also useful in that energy storage provides the best value when it can be installed near load centers. Distributed energy storage decreases, and, in volume use, eliminates the need for costly transmission and distribution infrastructure improvements and upgrades and/or additional fueled power plants. This is of tremendous value to the utility providers, as the long term operational maintenance costs increase with additional infrastructure.

The small footprint of the individual units allows a proportionately sized energy storage system to be located virtually anywhere, in new construction or as a retrofit system. Further, this invention allows capacity to be added at any time depending on the need and/or application.

In another embodiment, the hydraulic pump is replaced with pneumatic components to allow the pressurization of the fluid vessels to be accomplished without transferring fluid. Each reservoir is sealed and allows pneumatic charging and fluid discharging to accomplish the same functionality.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

DETAILED DESCRIPTION OF EMBODIMENTS OF THE INVENTION

Figure 1:
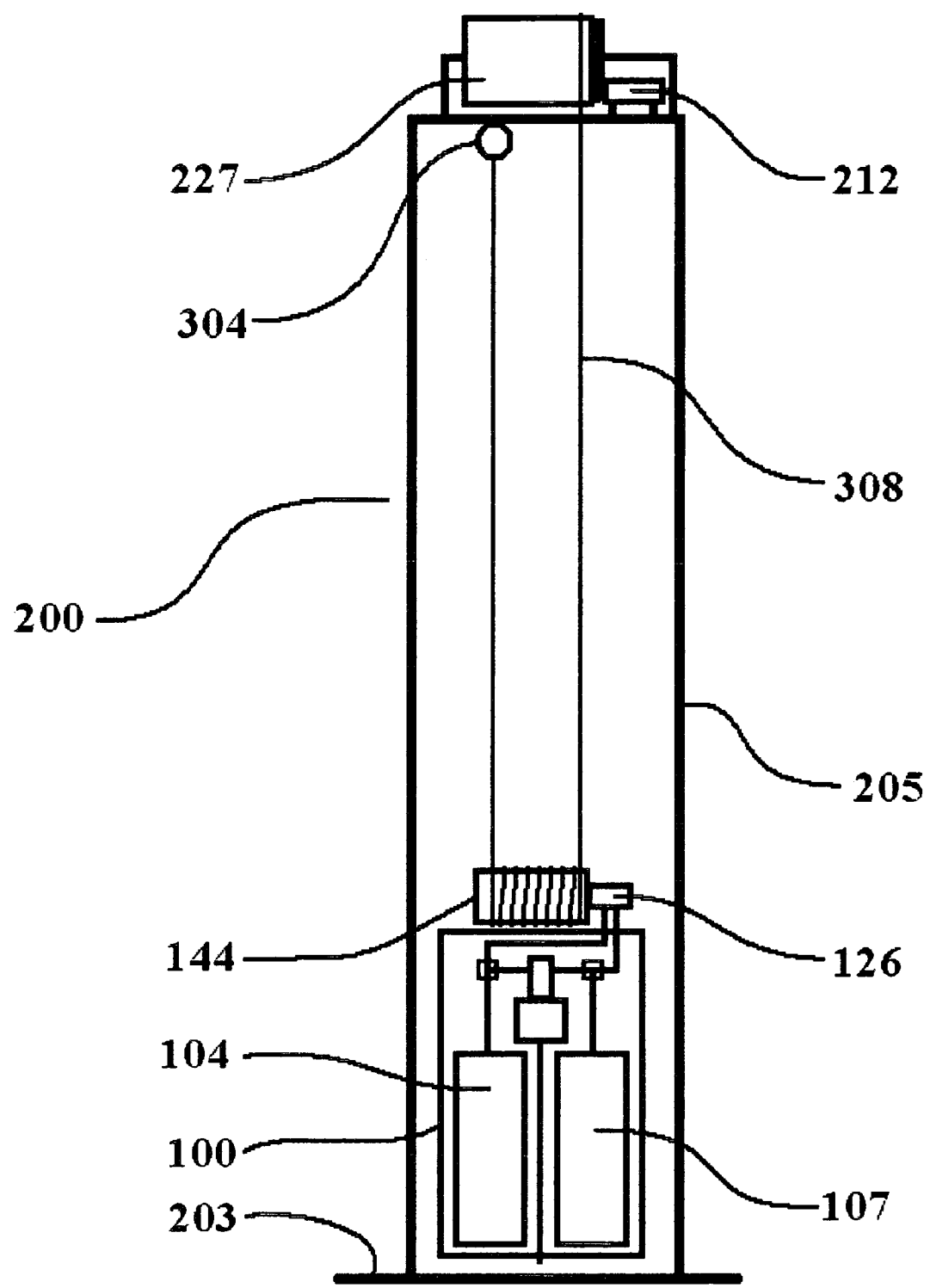
FIG. 1 is an illustrative drawing of the energy storage system of the present invention having energy capture, conversion, storage and production capabilities.

For the purposes of promoting an understanding of the principles of the invention, reference will now be made to the embodiments illustrated in the drawings, which will be described below. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Referring now to FIG. 1, the energy storage system generally defined as 100 is composed of several components, and these components are housed in a component mounting structure referred to as 101. Component mounting structure 101 may be a metal box which in this embodiment may be approximately 4 feet tall and 12 inches square. Component mounting structure 101 may be made from and suitable material. Angle iron may compose its skeleton and stretch steel or expanded metal may cover the open areas to prevent components or pieces of components from escaping structure 101 in the event of any failure.

Component mounting structure 101 houses fluid reservoir 104, high pressure fluid accumulator 107, electric generator 135, fixed displacement hydraulic motor 123, hydraulic fluid directional valves 163 and 165, and the various fluidic and electrical connections required as outlined in this embodiment and which are already known in the market.

Mounted on top of component mounting structure 101 is fixed displacement pump 126 and rotating cable drum 144. These components may be mounted on top of structure 101 or inside 101 just under the top. As long as the drum can be rotated by the cable, any mounting location is acceptable.

Rotating cable drum 144 and fixed displacement hydraulic pump 126 may be held in place by supports 173 and 175, which may be affixed to component mounting structure 101.

Referring again to FIG. 1, the premise of the invention is to transfer fluid from reservoir 104 to high pressure accumulator 107 using hydraulic pump 126. Hydraulic pump 126 is rotationally connected to rotating cable drum 144. Rotating cable drum 144 is rotated by the cable which is described in more detail in the description for FIG. 2.

When high pressure accumulator 107 is fully pressurized, it is effectively storing energy which may be used to generate electrical energy. High pressure accumulator 107 may provide pressurized fluid to fixed displacement hydraulic motor 123 which is rotationally connected to electrical generator 135. The hydraulically driven electrical generator 135 may then produce a current of electricity matched to the application. In this embodiment, grid balanced 60 cycle A/C electricity is provided, which negates the need for any electrical energy conversion such as a batteries direct current to grid balanced 60 cycle alternating current (D/C to A/C).

When high pressure hydraulic accumulator 107 has depleted its energy, the entire energy storage unit 100 is cycled through its conversion, transfer and storage of energy process through its gravitational operational function.

Figure 2:
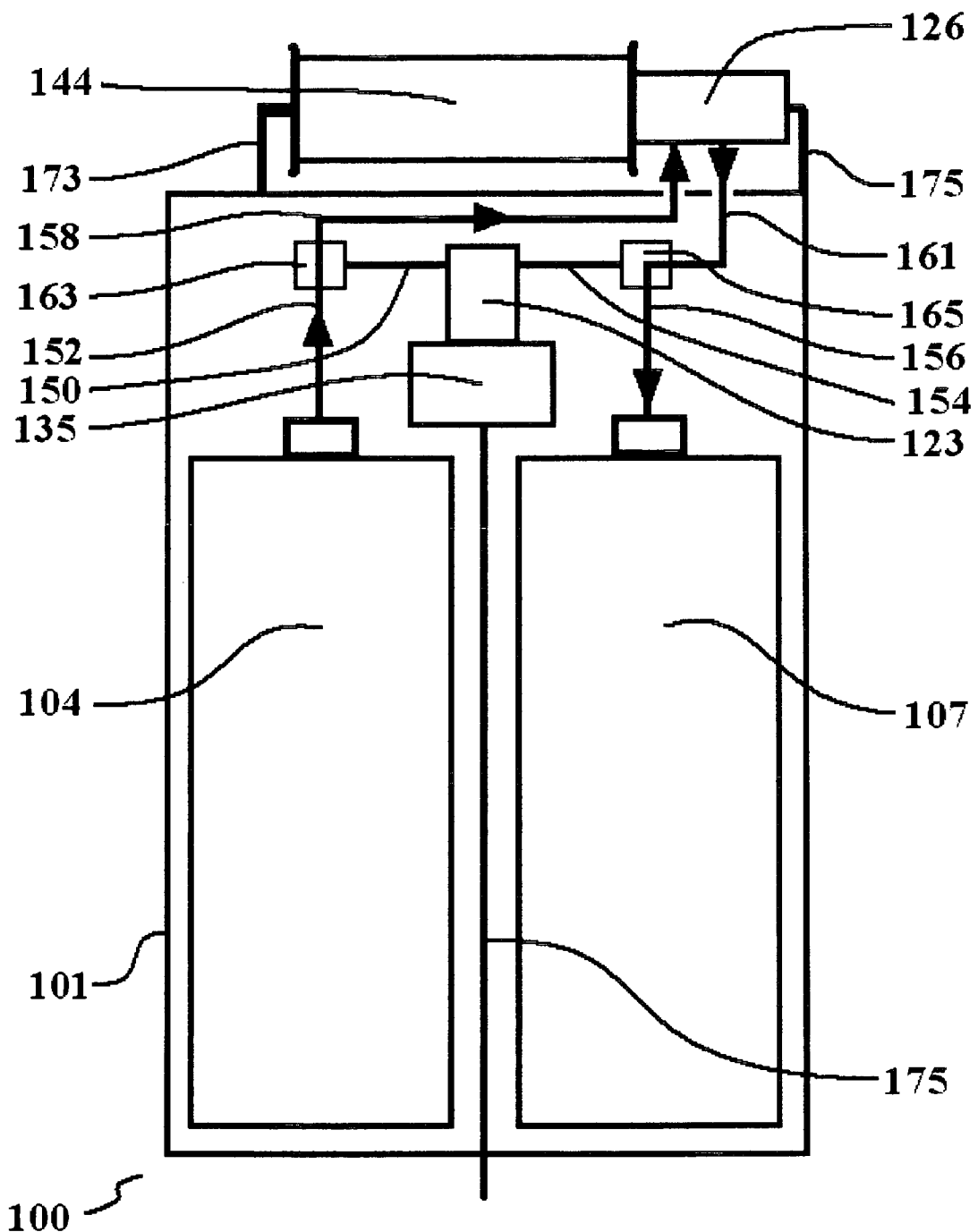
FIG. 2 is an illustrative drawing of the energy storage system of the present invention showing an aspect of the operation of the system wherein the carriage is being raised and dropped to fill the high pressure accumulator with either hydraulic fluid as in the first embodiment or, as in the second embodiment, gaseous transfer wherein pneumatic components may substitute some or all the hydraulic components to facilitate hydraulically and/or pneumatically driven energy storage and/or hydraulically or pneumatically driven energy production, such as hydraulic pump 126 may become pneumatic pump 126, hydraulic motor 123 may become pneumatic motor 123 and hydraulic fluid control valves 163 and 165 may become pneumatic control valves 163 and 165. Any combination of the alternatives described herein may be utilized, as the energy flow in both embodiments is the same and keeps within the framework of the present inventions spirit and scope, as the only aspect that changes is the driving or driven media.

Pneumatic components may substitute some or all the hydraulic components to facilitate hydraulically and/or pneumatically driven energy storage and/or hydraulically or pneumatically drive energy production, such as hydraulic pump 126 may become pneumatic pump 126, hydraulic motor 123 may become pneumatic motor 123 and hydraulic fluid control valves 163 and 165 may become pneumatic control valves 163 and 165. Any combination of the alternatives described herein may be utilized, as the energy flow in both embodiments is the same and keeps within the framework of the present inventions spirit and scope, as the only aspect that changes is the driving or driven media;

Now referring to FIG. 2, the conversion, transfer and storage of energy process using the gravitational aspect is described.

Energy storage unit 100 may placed horizontally between two vertical rails 205 which are bridged at the top. On top of the vertical rails mounts electric lift motor 212 and cable winding drum 227. Electric lift motor 212 is rotationally connected to cable winding drum 227. It may be advantageous to have electric lift motor 212 rotate winding drum 227 through a gear set or belt drive to gain multiplication of torque which is favorable to increase component efficiency and to reduce electrical current draw.

In operation, electric lift motor 212 rotates cable winding drum 227 which draws on lifting cable 308. Lifting cable 308 is wrapped around rotating cable drum 144 several turns, and then is attached to the top of the lifting structure 200 at point 304. This arraignment causes rotating cable drum to rotate multiple times during each full rotation of cable winding drum 227, providing a multiplication of torque and increased rotations of cable winding drum 144 while simultaneously lifting the entire energy storage unit 100 towards the top of lifting structure 200.

Rotating cable drum 144 rotates hydraulic pump 126, which in turn transfers hydraulic fluid from fluid reservoir 104 to high pressure accumulator 107. As electric lift motor 212 rotates cable winding drum 227 and causes energy storage unit 100 to rise, fluid transfer is calculated to cause high pressure accumulator to be filled only a portion of its capacity at the uppermost point of travel.

When energy storage unit 100 reaches the top, electricity to electric lift motor 212 is disconnected. This allows energy storage unit 100 to begin to fall. As energy storage unit 100 falls, cable winding drum 227 begins unreeling lifting cable 308, which in turn causes rotating cable drum 144 to rotate hydraulic pump 126 in the opposite direction compared to its assent rotation. Hydraulic pump 126 may be reversible in fluid direction to continue transfer of the fluid.

During descent, hydraulic pump 126 continues the transfer of fluid from reservoir 104 to high pressure accumulator 107, continuing the fill process of high pressure accumulator 107.

The system will be timed in such a manner as to provide a fully charged high pressure accumulator once energy storage unit 100 reaches the bottom of lifting structure 200. Energy storage unit 100 will remain motionless until called upon to produce work.

Figure 3:
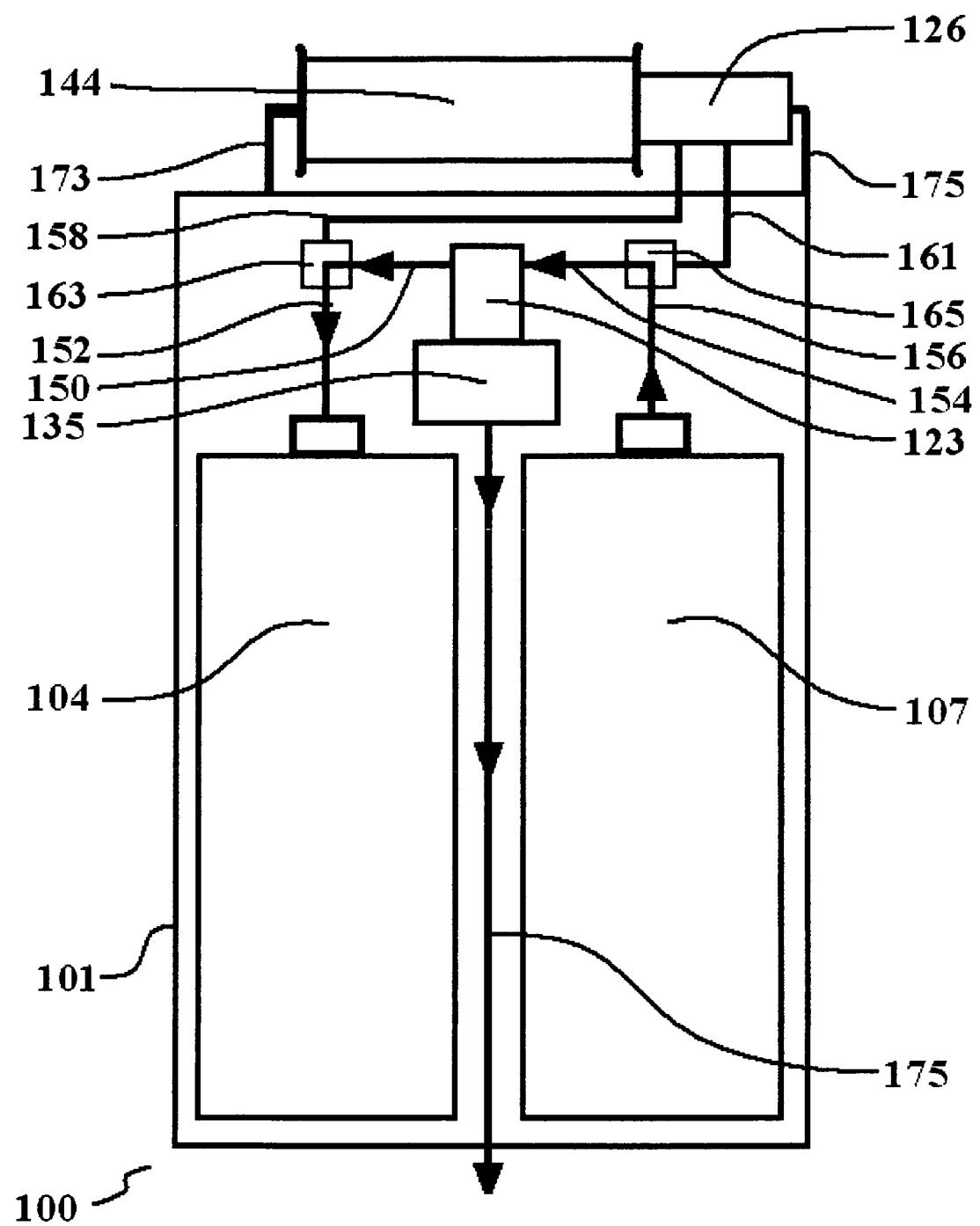
FIG. 3 is an illustrative drawing of the energy storage system of FIG. 1 showing an aspect of the operation of the system when the carriage is at rest in its lower most travel and the accumulator pressure is operating the hydraulic motor which rotates the generator and produces a current of electricity, and again, as in FIG. 2, pneumatic components may substitute some or all the hydraulic components to facilitate hydraulically and/or pneumatically driven energy storage and/or hydraulically or pneumatically drive energy production, such as hydraulic pump 126 may become pneumatic pump 126, hydraulic motor 123 may become pneumatic motor 123 and hydraulic fluid control valves 163 and 165 may become pneumatic control valves 163 and 165. Any combination of the alternatives described herein may be utilized, as the energy flow in both embodiments is the same and keeps within the framework of the present inventions spirit and scope, as the only aspect that changes is the driving or driven media.

Pneumatic components may substitute some or all the hydraulic components to facilitate hydraulically and/or pneumatically driven energy storage and/or hydraulically or pneumatically drive energy production, such as hydraulic pump 126 may become pneumatic pump 126, hydraulic motor 123 may become pneumatic motor 123 and hydraulic fluid control valves 163 and 165 may become pneumatic control valves 163 and 165. Any combination of the alternatives described herein may be utilized, as the energy flow in both embodiments is the same and keeps within the framework of the present inventions spirit and scope, as the only aspect that changes is the driving or driven media;

Referring now to FIG. 3, when a load is detected, the pressurized fluid in high pressure accumulator 107 will discharge its fluid, which may be directed to fixed displacement hydraulic motor 123, passing through hydraulic motor 123 causing rotation, and finally said fluid is returned to fluid reservoir 104.

Hydraulic motor 123 is rotationally connected to electric generator 135. Rotating hydraulic motor 123 rotates electric generator 135 which provides a current of electricity. This electricity may be grid balanced at 60 cycles to provide a current of A/C electricity which does not have to be conditioned to be successfully introduced into the utility grid. To maximize efficiency, the amount of energy required to rotate electric generator 135 may be equal to the work performed by rotating hydraulic motor 123.

When high pressure hydraulic accumulator 107 has discharged all of its available energy, the process is repeated. Lifting and dropping energy storage unit 100 to allow transfer of hydraulic fluid from fluid reservoir 104 to high pressure accumulator 107, then using the stored energy in high pressure accumulator 107 to operate hydraulic motor 123 which rotates electrical generator 135 to produce a current of electricity.

Figure 4:
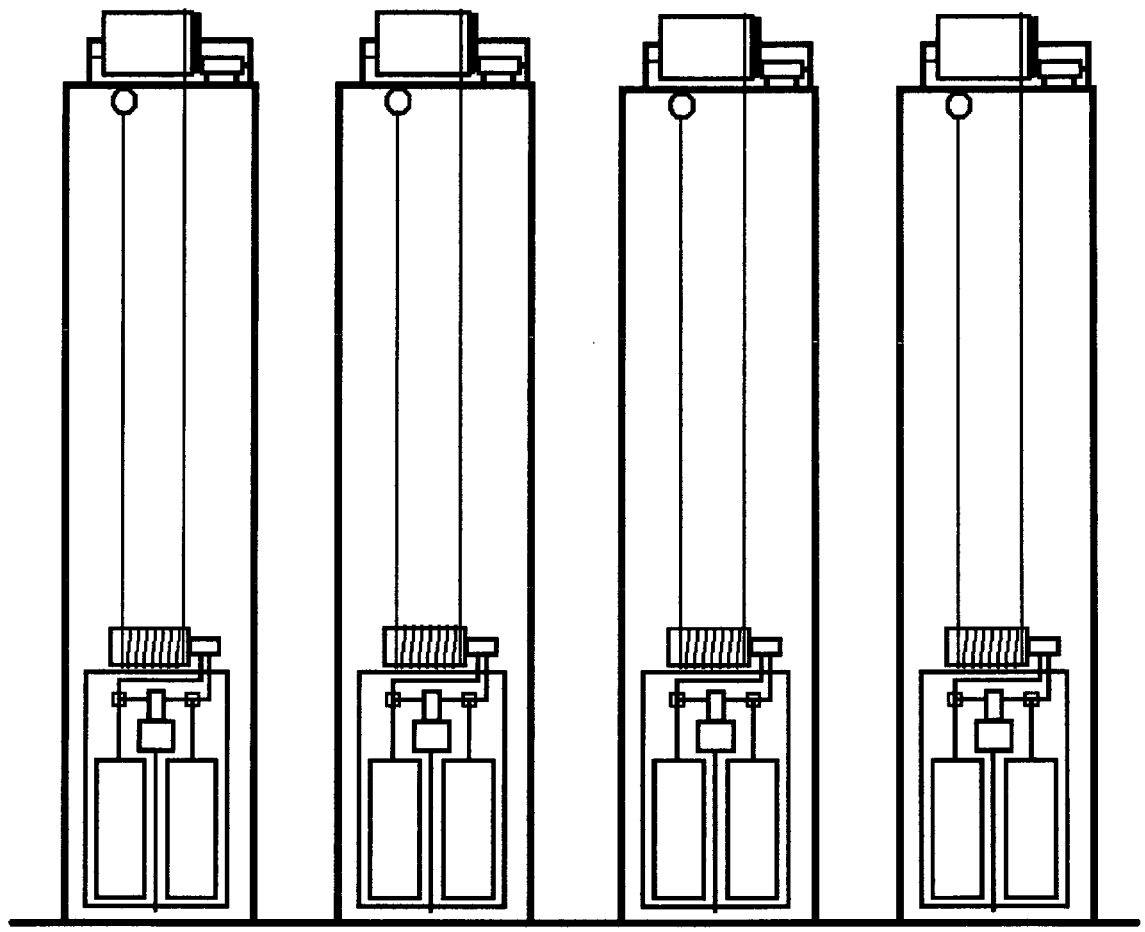
FIG. 4 is an illustrative drawing of the energy storage system of FIG. 1 showing a potential, but not numerically or directionally representative or limiting, grouping of individual units to provide increased capacity and output.

Pneumatic components may substitute some or all the hydraulic components to facilitate hydraulically and/or pneumatically driven energy storage and/or hydraulically or pneumatically drive energy production, such as hydraulic pump 126 may become pneumatic pump 126, hydraulic motor 123 may become pneumatic motor 123 and hydraulic fluid control valves 163 and 165 may become pneumatic control valves 163 and 165. Any combination of the alternatives described herein may be utilized, as the energy flow in both embodiments is the same and keeps within the framework of the present inventions spirit and scope, as the only aspect that changes is the driving or driven media;

Referring now to FIG. 4, individual energy storage units are grouped together, but not numerically or directionally representative or limiting, providing increased storage and output capacity.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in particular forms, but such exemplifications are not to be construed as limiting the scope of the invention in any manner.

While the invention has been taught with specific reference to the above described embodiments, one skilled in the art will recognize that changes can be made in form and detail without departing from the spirit and scope of the invention. For example, the energy supply source may include other types of batteries in addition to lithium-ion such as lead acid batteries, metal-hydrate nickel batteries, or any other known electrical energy storage device. Also, a single combined fluid supply tank that serves both as a reservoir and hydraulic accumulator system may be used instead of the duel tanks shown.

This invention utilizes electrical, hydraulic and gravitational functionalities in a new and novel arraignment to efficiently capture, convert, store and produce energy with commercially available components that are relatively cheap, market proven, efficient and very reliable.

Electric lifting motor 212 may be of the A/C or D/C type. In the event electric lifting motor is of the alternating current type, electricity from the utility grid may be utilized to raise energy storage unit 100. This may be advantageous in that it provides a directly connected energy storage system and load balancing mechanism for the utility grid.

In the event electric lifting motor 212 is of the direct current type, electricity from D/C batteries, ultra capacitors, or other D/C electrical energy production and/or storage devices may be used to lift energy storage unit 100. This is advantageous in that a renewable energy component may be used to charge the batteries and/or operate the lifting portion.

This embodiment would provide a highly efficient, utility grid compatible renewable energy storage and production system. Also, grid electricity may be stored in the batteries when other renewable energy is unavailable or undesirable.

Solar, wind, and other renewable energy sources may provide electrical energy which may be directed to the systems battery packs that provide the electrical energy to operate energy storage unit 100.

Further, hydraulic power may be harnessed through tidal and wind driven hydraulic machines to provide additional potential renewable energy capture, storage and distribution. Lifting of 100 may be accomplished by hydraulically driven winding drums.

The battery packs may be of any chemical composition. In this embodiment, Lithium Ion 18650 cells are grouped in series and parallel to provide the energy needed to operate energy storage system 100. The batteries may be housed in a suitable enclosure and mounted anywhere, but for the purpose of this description, at or near the base of lifting structure 200 provides easy access during maintenance procedures or other work.

In this embodiment, electrical energy from the battery is only consumed during the assent of energy storage unit 100. During descent, system inactivity and electrical energy production, the batteries are unused and available for charging from the renewable energy source(s) or the electric utility grid.

Singularly, this is an efficient energy conversion, transfer, storage and production system that has limited use due to cycling of the operational events and cycle duration. However, grouped together in large quantities, this invention provides a new and unique invention to store energy for the utility grid and end users.

This invention may comprise dozens of energy storage units grouped together, hundreds, thousands, tens of thousands or millions. The limit is available space. Combined groupings interlaced throughout the utility transmission, distribution or local feeds simply add storage capacity. Further, this invention may be scaled up or down to provide energy storage in many diverse applications and processes. Kilowatt to megawatt class storage facilities may be provided.

Additionally, it may be advantageous to connect this invention to any size fueled generator which may provide its own conversion of energy in addition to or away from the utility grid itself. Fuel cells, nuclear power generation, hydro, tidal, wave, flywheel, and all other forms of electrical generation may be included with this invention to achieve the desired results.

The invention may be housed in a structure such as a building of specific height, comprising the energy storage system. Large buildings could be erected which contained multiple groups stacked one above the other, making a vertical energy warehouse that may be designed to be aesthetically pleasing.

Solar panels may be installed on the outside of the building or around the building to take advantage of this renewable energy source. Additionally, wind turbines may be placed on or near the building(s) to take advantage of this renewable energy source. The building may be located near a body of water to incorporate tidal energy capture.

Further, this invention may be retrofitted into existing structures where it would be advantageous to do so, such as a factory. The invention may be attached to the outside or inside of an existing building, or placed under a structure such as a parking lot or football field, or under electrical utility transmission line structures. Mobile applications may be used to provide deployable energy storage, as well as on and offshore platforms.

This invention may be incorporated into utility poles or other repeating structures used in the utility grids physical plant. Further, the system may be installed into existing structures or suitable housings to retrofit the structure for increased energy efficiency.

This invention may allow one lifting device to lift multiple storage and production units, or, conversely, multiple lifting units may provide for the lifting of one storage and production unit.

The storage and production unit may be separated, wherein the conversion and storage unit is operated vertically (or any angle, swing or spiral), and through an electrical or hydraulic connection, the production of the energy may be located in another location at any distance (such as directly underneath 100).

This invention may be used in a mobile structure, such as a semi trailer. In this application, an energy storage and production system may arrive at a location where the energy is needed, perhaps after a disaster or weather event, or as a deployable energy storage system for forward military areas or support, or as a purchasable energy system for commercial or event users. Upon arrival, the trailers may be raised on end and may be connected to a load and/or a source of energy which may include solar, wind, tidal or fueled energy production. The mobile units may be operated singularly or in plurality. This invention may also be used in marine and aviation applications.

This invention may be incorporated into thrill rides and amusement parks with the intention of increasing operational efficiency and reducing operating costs. Additionally, this invention may be incorporated into the operation of passenger and freight elevators, either directly or indirectly providing power to operate said elevator system.

This patent application and its description of a particular embodiment does not limit or curtail any variation of the system as described herein. Changes in operational functions, component placement or functionality, angle of assent or descent, storage media used, the storage media duration and of its contribution of work performed, additions to or subtractions from the basic premise behind the invention are all included herein by reference.

What is claimed is:

1. An energy storage system comprising:
   at least one stationary vertical structure including a horizontal support base, at least one vertical rail perpendicularly attached to said horizontal support base and a horizontal component mounting structure attached perpendicularly to the top of said vertical structure;
   at least one cable winding drum or spool device located on top of said vertical structure;
   at least one electric motor electrically connected to an electrical energy supply source and rotationally connected to said cable winding drum or spool device;
   at least one movable enclosure placed inside said vertical structure;
   wherein said at least one movable enclosure comprises:
      at least one low pressure fluid reservoir and at least one high pressure fluid accumulator; and
      at least one electrical generator; and
      at least one hydraulic motor of fixed or variable displacement type in fluid communication with said at least one low pressure fluid reservoir and said at least one high pressure fluid accumulator and rotationally connected to said at least one electrical generator;
   at least one cable wrapping drum located on top of said movable enclosure;
   at least one hydraulic pump in fluid communication with said at least one low pressure fluid reservoir and said at least one high pressure fluid accumulator and rotationally connected to said at least one cable wrapping drum; and
   at least one flexible connective means including at least one of a cable, a wire, a rope, a belt and a chain rotationally connected to said at least one cable winding drum or spool device and to said at least one cable wrapping drum;
   wherein, in operation, said at least one electric motor rotates said at least one cable winding drum or spool device which draws on said at least one flexible connective means while lifting said at least one moveable enclosure, wherein lifting said at least one moveable enclosure rotates said at least one cable wrapping drum and thus rotates said at least one hydraulic pump, transferring hydraulic fluid from said at least one low pressure fluid reservoir to said at least one high pressure fluid accumulator;
   wherein, when said at least one moveable enclosure reaches the top of said at least one vertical structure, said electrical energy supply source is disconnected from said at least one electric motor and said at least one moveable enclosure begins to fall, wherein during descent said at least one hydraulic pump continues to transfer hydraulic fluid from said at least one low pressure fluid reservoir to said at least one high pressure fluid accumulator,
   wherein, when a load is detected, pressurized fluid from said at least one high pressure fluid accumulator is discharged to said at least one hydraulic motor and returned to said at least one low pressure fluid reservoir, wherein rotation of said at least one hydraulic motor rotates said at least one electrical generator to provide a current of electricity.

* * * * *